US011574099B2

(12) United States Patent
Balasubramanian et al.

(10) Patent No.: US 11,574,099 B2
(45) Date of Patent: Feb. 7, 2023

(54) SIMULATION FRAMEWORK

(71) Applicant: TEXAS INSTRUMENTS INCORPORATED, Dallas, TX (US)

(72) Inventors: Lakshmanan Balasubramanian, Karnataka (IN); Venkatraman Ramakrishnan, Karnataka (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/393,263

(22) Filed: Aug. 3, 2021

(65) Prior Publication Data

US 2022/0083718 A1    Mar. 17, 2022

Related U.S. Application Data

(60) Provisional application No. 63/153,060, filed on Feb. 24, 2021.

(30) Foreign Application Priority Data

Aug. 13, 2020 (IN) .............................. 202041034780

(51) Int. Cl.
*G06F 30/3308* (2020.01)
*G06F 30/327* (2020.01)
(Continued)

(52) U.S. Cl.
CPC ........ *G06F 30/3308* (2020.01); *G06F 30/323* (2020.01); *G06F 30/327* (2020.01);
(Continued)

(58) Field of Classification Search
CPC .. G06F 30/3308; G06F 30/327; G06F 30/323; G06F 30/337; G06F 30/367; G06F 30/373; G06F 2119/06; G06F 2119/18
(Continued)

(56) References Cited

U.S. PATENT DOCUMENTS 9,141,741 B1 * 9/2015 Lin ........................ G06F 30/327
10,769,329 B1 * 9/2020 Chilwal ................. G06F 30/337
(Continued)

FOREIGN PATENT DOCUMENTS

JP          2020038693 A  *  3/2020  ......... G06F 17/5022

*Primary Examiner* — Phallaka Kik
(74) *Attorney, Agent, or Firm* — Carl G. Peterson; Frank D. Cimino

(57) ABSTRACT

A method comprises creating an electronic module design having a plurality of electronic components and defining a model of functional behavior of a subset of the plurality of electronic components, the subset of the plurality of electronic components excluding a first electronic component. Functional behavior of the first electronic component is defined in a user-defined functional design intent file based on a first template, and a power behavior of the first electronic component is defined in a user-defined power design intent file based on a second template. A simulation file is generated based on the model of functional behavior and based on the functional behavior and the power behavior of the first electronic component. The simulation file is run to simulate operation of the electronic module design. A performance status is determined of the electronic module design in response to running the simulation file.

20 Claims, 10 Drawing Sheets

(51) Int. Cl.
  *G06F 30/323* (2020.01)
  *G06F 30/337* (2020.01)
  *G06F 30/367* (2020.01)
  *G06F 30/373* (2020.01)
  *G06F 119/06* (2020.01)
  *G06F 119/18* (2020.01)

(52) U.S. Cl.
  CPC .......... *G06F 30/337* (2020.01); *G06F 30/367* (2020.01); *G06F 30/373* (2020.01); *G06F 2119/06* (2020.01); *G06F 2119/18* (2020.01)

(58) Field of Classification Search
  USPC ........... 716/106, 103, 104, 111, 136; 703/16
  See application file for complete search history.

(56) References Cited

U.S. PATENT DOCUMENTS

| | | | |
|---|---|---|---|
| 2008/0250364 A1* | 10/2008 | Chilwal | G06F 30/367 716/109 |
| 2009/0006065 A1* | 1/2009 | Kariat | G06F 30/367 703/14 |
| 2009/0007032 A1* | 1/2009 | Kariat | H01L 22/12 716/136 |
| 2011/0161899 A1* | 6/2011 | Ginetti | G06F 30/33 716/125 |
| 2011/0161900 A1* | 6/2011 | Ginetti | G06F 30/33 716/125 |
| 2013/0338991 A1* | 12/2013 | Lin | G06F 30/367 703/14 |
| 2015/0324505 A1* | 11/2015 | James | G06F 30/36 716/103 |
| 2017/0011138 A1* | 1/2017 | Venkatesh | G06F 30/327 |
| 2022/0075920 A1* | 3/2022 | Bansal | G06F 30/3323 |

* cited by examiner

```
...
REG_NAME_0 | F | CLK_0 | P | RSTN_0 | L | | | RET_0 | H
REG_NAME_1 | F | CLK_1 | P | RSTN_1 | L | | | RET_1 | H
REG_NAME_2 | F | CLK_1 | P | RSTN_1 | L | | | RET_1 | H
REG_NAME_3 | F | CLK_1 | P | RSTN_1 | L | | | RET_1 | H
REG_NAME_4 | F | CLK_1 | P | RSTN_2 | L | | | RET_1 | H
...
```

```
@ Time0
    Read list of registers and their dependencies

@ Every simulation time step
    For each Register {
        ...
        Save the state of Q at "Save" edge;
        @ ("SHUTOFF" state falling edge) {
            If CLRZ asserted
                Force "Reset" value on Q
        };
        @ ("RET" signal falling edge) {
            If CLRZ asserted
                Force "Reset" value on Q
            Else
                Restore (Force) the saved state
        };
    };
```

1300

@ Time0
   Read list of registers and their dependencies

@ Every simulation time step
   For each Register {
     ...
     Check for valid state of associated clock;
     @ Any violation {
        Corrupt the saved state };
     Save the state of Q at "Save" edge;
     @ ("RET" signal falling edge) {
        If "CLRZ" asserted
           Force "Reset" value on Q
        Else
           If no violation
               Restore (Force) the saved state
           Else
               Corrupt Q
     };
   };

1401 macro UDLP_RET_CLK_LOW_NO_TOGGLE
...
   create_power_domain PRIMARY –boundary_ports {D Q CLK_NAME_PORT RST_NAME_PORT PRESET_NAME_PORT} –primary_power_net VDD –primary_ground_net VSS
   create_power_domain SECONDARY –boundary_ports {RET_NAME_PORT} –primary_power_net VDDC –primary_ground_net VSS
...
endmacro

FIG. 14

SIMULATION FRAMEWORK

CROSS-REFERENCE TO RELATED APPLICATION

This application hereby claims the benefit of and priority to U.S. Provisional Patent Application Ser. No. 63/153,060, filed Feb. 24, 2021, and to Indian Provisional Patent Application Number 202041034780, filed Aug. 13, 2020, both entitled "GENERIC SCALABLE LOW POWER SIMULATION FRAMEWORK", and which are hereby incorporated by reference in their entirety.

BACKGROUND

In electronic design, a semiconductor intellectual property ("IP") core (often referred to as an "IP core," or "IP block") references a reusable unit of logic, cell, or integrated circuit (commonly called a "chip") layout and design. It gets its name because it may refer to information that is the legal Intellectual Property of a particular party. In the context of this disclosure, IP will refer to the logic and/or metadata associated with design specifications of a chip or System on a Chip ("SoC"). Modern circuit design often involves electronic design automation (EDA) tools to simulate and verify circuit block operation and interconnections. Third-party EDA tool vendors provide services such as the generation of simulation files including executable simulator software for the simulation of circuit block operation and interconnection verification.

Generation of the EDA tool simulation files may use pre-validated cells from a standard library and/or standard primitive functions from hardware description language (HDL) standards when possible to simulate cells or components of the chip design that are described by the pre-validated cells or HDL primitive functions. For example, logic gates in the chip design that behave according to long-established rules may be simulated by using corresponding pre-validated cells or HDL primitive functions. However, when the chip design involves IP cores utilizing specially-designed cells that behave differently than any of the pre-validated cells in the standard library or the HDL primitive functions, the functionality and behavior of the cells can be shared with the EDA tool vendor to incorporate the new behavior into the provided simulation file package.

Working with the EDA tool vendor to obtain a simulation file package can also be time consuming Often, the turnaround time from requesting to receiving the simulation file package can lead to delays in the design and manufacture of the chip that can reduce competitive advantage in the field. Further, when changes are made in the design of the IP cores and simulation of the changes are desired, the changes are sent to the EDA tool vendor for the creation of a new simulation file package, which can further delay the design project.

SUMMARY

In accordance with one aspect, a method comprises creating an electronic module design having a plurality of electronic components and defining a model of functional behavior of a subset of the plurality of electronic components based on the electronic module design, the subset of the plurality of electronic components excluding a first electronic component of the plurality of electronic components. Functional behavior of the first electronic component is defined in a user-defined functional design intent file based on a first template, and a power behavior of the first electronic component is defined in a user-defined power design intent file based on a second template. A simulation file is generated based on the model of functional behavior and based on the functional behavior and the power behavior of the first electronic component. The simulation file is run to simulate operation of the electronic module design. A performance status is determined of the electronic module design in response to running the simulation file.

In accordance with another aspect, a system comprises a non-transitory computer-readable medium storing software instructions, wherein the software instructions comprise software instructions to access, via a simulation program, a system model of functional behavior of a circuit design comprising a first electronic component, a user-defined functional design intent file defining a functional behavior of a second electronic component, and a user-defined power design intent file defining a power behavior of the second electronic component. The user-defined functional design intent file and the user-defined power design intent file are external to the simulation program. The software instructions also comprise software instructions to create, via the simulation program, a simulation file based on the system model and based on the functional behavior and the power behavior of the second electronic component, the simulation file comprising simulation operation details for the first and second electronic components. The software instructions also comprise software instructions to run, via the simulation program, a first simulation of the circuit design using the simulation file in a simulation program, the simulation file configured to cause the simulation program to simulate an operation of the first electronic component based on the simulation operation details for the first electronic component and simulate operation of the second electronic component based on the simulation operation details for the second electronic component.

BRIEF DESCRIPTION OF THE DRAWINGS

In the drawings:

FIG. 11 illustrates a portion of a table of circuit simulation objects according to one or more disclosed implementations.

FIG. 12 is an example of a portion of a pre-validated functional design library file according to one or more disclosed implementations.

FIG. 13 is an example of a portion of a user-definable functional design intent code usable with the user-definable functional design intent template file of FIG. 8 according to one or more disclosed implementations.

FIG. 14 is an example of a portion of a user-definable power design intent code usable with the user-definable power design intent template file of FIG. 9 according to one or more disclosed implementations.

DETAILED DESCRIPTION

Figure 1:
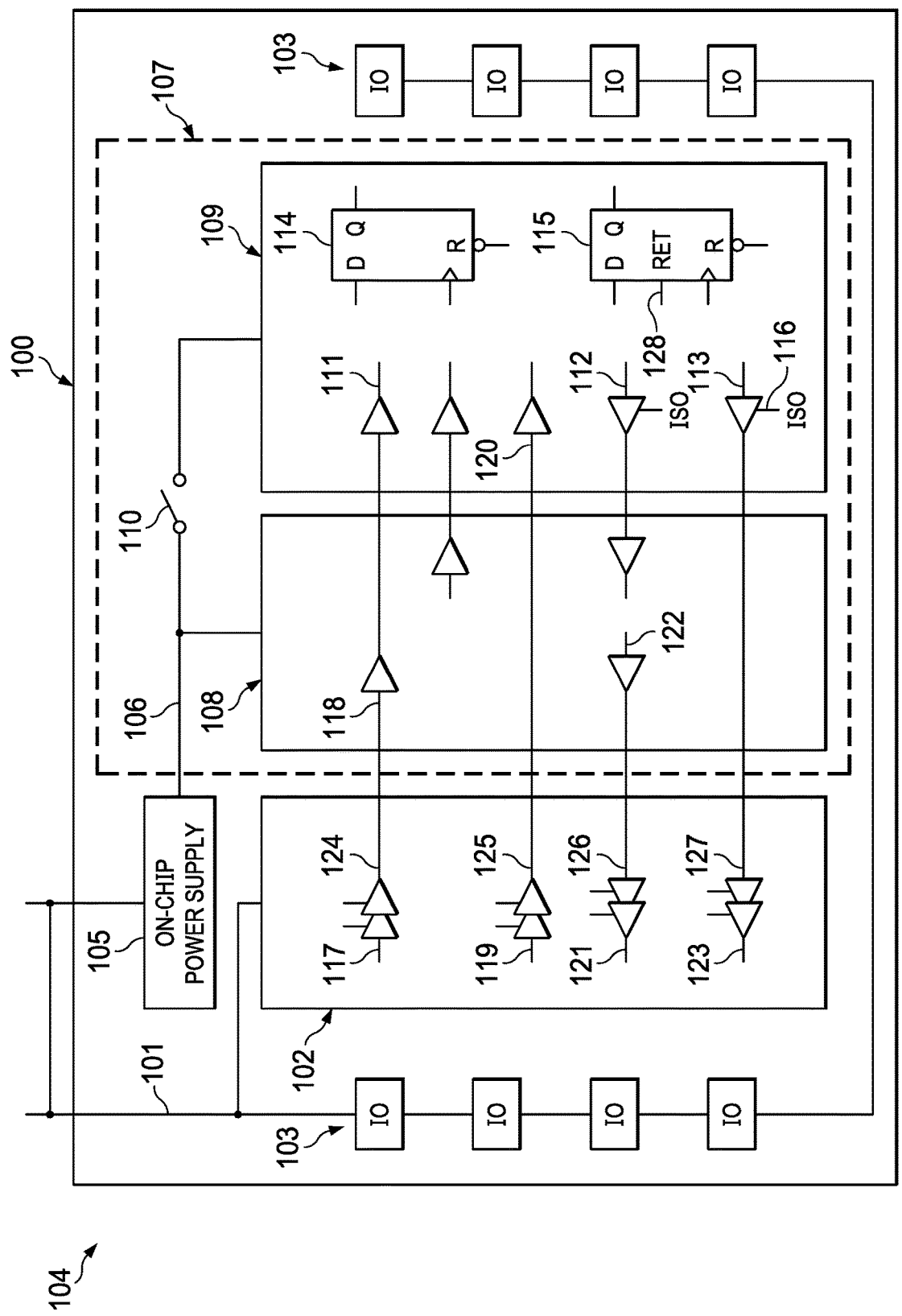
FIG. 1 is an example block diagram of a portion of an SoC according to one or more disclosed implementations.

In the following description, for purposes of explanation, numerous specific details are set forth in order to provide a thorough understanding of the examples disclosed herein. It will be apparent, however, to one skilled in the art that the disclosed example implementations may be practiced without these specific details. In other instances, structure and devices are shown in block diagram form in order to avoid obscuring the disclosed examples. Moreover, the language used in this disclosure has been principally selected for readability and instructional purposes and may not have been selected to delineate or circumscribe the inventive subject matter, resorting to the claims being necessary to determine such inventive subject matter. Reference in the specification to "one example" or to "an example" means that a particular feature, structure, or characteristic described in connection with the examples is included in at least one implementation.

As used herein, the term "medium" refers to one or more non-transitory physical media that together store the contents described as being stored thereon. Examples may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example implementations of applications and functions include software modules, software objects, software instances and/or other types of executable code.

Aspects of this disclosure apply to both low-power components and non-low-power components. Low-power components are those that operate at lower power consumption under specified special circumstances as can be realized in a special mode of operation enabled by a set of one or more associated control signals. The low-power operation to reduce power consumption can be implemented as power gating, for example, where the voltage supplied to a first portion of the low-power component is turned off or shut off (e.g., using a power switch) while having the voltage supplied to a second portion thereof maintained. Isolation and state retention may be additionally implemented to maintain functional and/or reliability aspects of the low-power component during power gating operation and to allow restoration of the low-power component to an intended state with fewer overheads when the power supply to the first portion is subsequently restored. Low-power operation can further include static or dynamic voltage scaling or biasing including using on-chip supplies where the supply voltage of a first portion of the low-power component is scaled down to a different level (e.g., to a lower level such as in the CMOS circuit design context) while having the voltage supplied to a second portion thereof maintained. Level shifting between the two portions operating at different supply voltage levels may be additionally implemented to maintain functional and/or reliability aspects of the low-power component during supply scaling. Low-power operation may also include dynamic frequency scaling where the frequency of the clock supplied to the first portion of the low-power component is scaled down to a lower frequency or clock gating where the clock is completely stopped while having the clock supplied to a second portion thereof maintained at the nominal or higher frequency of operation. Non-low-power components are those that operate without simultaneous multiple power levels during low-power modes such as where a portion of the component is turned off while another portion still has power. Instead, the entire component is turned off or turned on as needed. Simulation of each of the low-power and non-low-power components is improved via aspects of this disclosure.

FIG. 1 illustrates a block diagram of an SoC 100 according to one or more implementations. A typical SoC comprises multiple hardware components, including, but not limited to:

a microcontroller, microprocessor, or digital signal processor (DSP) core-multiprocessor SoCs (MPSoC) having more than one processor core;

memory blocks including a selection of ROM, RAM, EEPROM, and flash memory;

timing sources including oscillators and phase-locked loops;

peripherals including counter-timers, real-time timers, and power-on reset generators;

external interfaces including industry standards such as USB, FireWire, Ethernet, USART, and SPI;

analog interfaces including ADCs and DACs; and voltage regulators and power management circuits.

The above listing of hardware elements is not exhaustive. For simplicity, only a portion of the possible components that may be implemented in an entire SoC design are shown and discussed herein. The SoC 100 includes a main power supply bus 101 supplying power to a first IP block 102 and to a plurality of input/output ("I/O") ports 103 arranged to communicate data into and out of the SoC 100. The connections of the first IP block 102 and the I/O ports 103 to the main power supply bus 101 forms a first power island 104. As illustrated in FIG. 1, the main power supply bus 101 inputs power from outside the SoC 100. In other implementations, however, the SoC 100 may include an on-chip power supply (not shown) providing the power to the main power supply bus 101.

An on-chip supply 105 illustrated in FIG. 1 provides power to an auxiliary power supply bus 106. The on-chip supply 105 is configured to supply a voltage at a different value than the voltage supplied by the main power supply bus 101. Accordingly, an auxiliary power island 107 is formed separate from the first power island 104. In one example, the voltage supplied by the main power supply bus 101 may be 5 V while the voltage supplied by the auxiliary power supply bus 106 may be higher or lower than 5 V (e.g., 3.3 V). The on-chip supply 105 may further deliver some of its power off the SoC 100 to external components. As illustrated, the auxiliary power island 107 includes second and third IP blocks 108, 109 within the SoC design.

Including components capable of going into a low-power state in the design of the SoC 100 can yield a savings in power usage during periods in which the operation of these components at full power is not required. As illustrated in FIG. 1, a power switch 110 is serially coupled between the auxiliary power supply bus 106 and the third IP block 109. During certain portions of the operation of the SoC 100, maintaining the supply of power from the auxiliary power supply bus 106 to the entire third IP block 109 may not be needed due, for example, to operations of the SoC 100 involving other areas or components of the SoC 100. During these periods of operation, power usage can be reduced by turning off those portions of the SoC 100 not involved in the current operations. In the implementation shown in FIG. 1, the third IP block 109 is set up to have its power supply from the auxiliary power supply bus 106 turned off via the power switch 110.

The third IP block 109 includes a plurality of components such as input components 111, output components 112-113, a first flip-flop 114, and a second flip-flop 115. The input components 111 and the standard flip-flop 114 illustrate those components of the third IP block 109 in a non-low-power category that are completely disabled when the power from the auxiliary power supply bus 106 is turned off to the third IP block 109 during a power-save mode. That is, when the power switch 110 is in an open state, the components in the non-low-power category completely turn off and consume no power during the power-save mode. Turning these non-low-power category components off during the power-save mode is possible because their operation during the power-save mode is not needed in the operations performed by the SoC 100 using other parts of the SoC design. Further, the operating state of these non-low-power category components at the time of shut off is not important to the startup of the third IP block 109 when the supply voltage is re-established.

In contrast, the output components 112, 113 and the standard flip-flop 115 belong to the low-power category of components. The low-power category components can help reduce power consumption during the power-save mode by having a portion thereof turned off by the power switch 110. However, shutting off power to the entire component in the low-power category can reduce or even be counter-productive to the power consumption minimizing efforts attempted during the power-save mode and may also result in unexpected erroneous functional behavior. That is, due to the construction of the low-power category components, a higher usage of power may be realized by turning off the power supply to these components during the power-save mode compared with the power used by leaving these components in a fully on state. This higher usage of power is usually realized in the rest of the SoC whose power supply remains on and interacts with such output components 112, 113 and 115. Beneficially, leaving the power supplied to a portion of these components while shutting the power off to the rest of these components contributes to power consumption minimization efforts.

As an example of a first low-power component, the output components 112, 113 represent isolation cells isolating the outputs of the third IP block 109 from the first IP block 102 or the second IP block 108 during the power-save mode. By supplying power to a small portion of the isolation cells 112 and 113 and enabling or asserting an isolation control pin 116 during the power-save mode, the isolation cells operate to isolate the third IP block 109 from the first IP block 102 or the second IP block 108 when the supply of the power from the auxiliary power supply bus 106 is turned off.

Another example of a low-power component includes the low-power state retention flip-flop 115. By supplying power to a portion of the low-power flip-flop 115 and enabling or asserting a retention control pin RET 128 during the power-save mode, its output state at the time of the power shut off or at the assertion of the retention control pin RET 128 can be saved to be restored in response to re-supplying the power from the auxiliary power supply bus 106 and de-assertion of the retention control pin RET 128 after the power-save mode. By saving the current state of the flip-flop prior to turning off its supply power, restoration of the saved state can be quicker than re-establishing its state through other means such as by accessing memory storage and re-setting the state of the flip-flop therefrom. Accordingly, power usage that would be used to re-set the state by accessing memory storage can be avoided.

Figure 2:
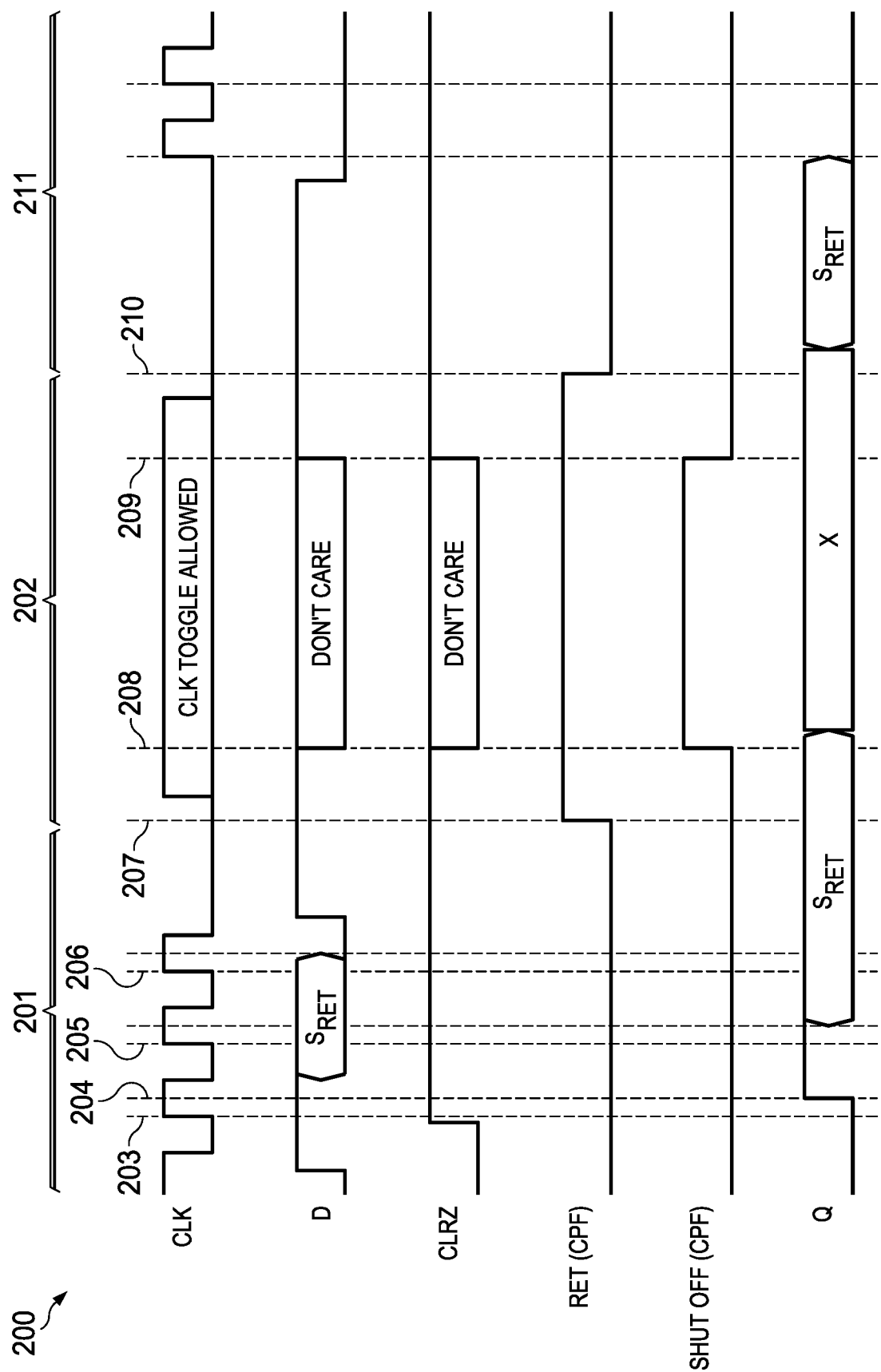
FIG. 2 is an example interface functional waveform of a low-power cell according to one or more disclosed implementations.

FIGS. 2-5 illustrate example interface functional waveforms describing an operation of a low-power flip-flop cell such as flip-flop 115 of FIG. 1 according to different implementations. FIG. 2 illustrates interface functional waveforms 200 showing operation of an exemplary low-power D flip-flop cell with state retention functionality before, during, and after a power-save operational mode in an example. The interface functional waveforms 200 illustrates signals for a clock input (CLK), a data input (D), a reset input (CLRZ), a retention control input (RET), a shutoff state (SHUTOFF) representing the state of the power supply to the flip-flop, and a data output (Q). The CLRZ input as used herein is an active low reset that causes the flip-flop to clear the output Q if the CLRZ signal is low independent of the clock state.

During a first portion 201 of the interface functional waveforms 200 occurring before a low-power mode portion 202, the flip-flop operates according to a typical D flip-flop. As illustrated at a first time point 203, when a high signal is input on the data input D during a rising clock edge and in response to a de-asserted reset input (e.g., a high signal on the CLRZ input), a high output is produced on the data output Q after a short internal delay at a second time point 204. Subsequent time points 205, 206 during the first portion 201 further illustrate the standard operation for a D flip-flop. That is, during a de-assertion of the reset input and in response to a clock change (e.g., rising clock edge), a high or low signal on the data input D results in a respective high or low signal on the data output Q.

While portions of the flip-flop illustrated in FIG. 2 are designed to operate as a typical D flip-flop during the first portion 201, the flip-flop is a low-power component capable of low-power operation including state retention functionality during a power-save mode such as during the low-power mode portion 202. In the low-power mode portion 202, the retention input is brought to a high value at a third time point 207. The high input asserted on the retention control input signals the flip-flop to save the state of the data output Q during the low-power mode portion 202 when a portion of the flip-flop will be shut off to conserve power during a shutdown event. The portion of the flip-flop not shut off during the low-power mode portion 202 retains the saved state of the data output Q. Following the assertion of the retention control input, the primary power supply to the flip-flop is switched off at a fourth time point 208 represented by shutoff state as asserted thereto. In response to shutting of the primary supply, the saved state of the flip-flop is unaffected by any changes to the clock input, the data input D, or the reset input. As indicated in FIG. 2, clock toggling is allowed during the shutoff, and the data input D and the reset input are "don't care" conditions where their values do not affect the data output Q. An "X" portion indicated on the data output Q during the shutoff represents a power off condition of the data output Q where the signal on the data output Q is undetermined.

At a fifth time point 209, the shutoff state is de-asserted (e.g., brought low) by switching on the primary power supply to the flip-flop, which may be in response to ending a power-save mode of the SoC 100, for example. Maintaining the assertion (e.g., high signal) of the retention input subsequently to switching on the primary power supply i.e., de-assertion of the shutoff state operates to block any value change of the data output Q in response to the data input D or the clock input. As such, the value of data output Q remains undefined after the fifth time point 209.

The retention control input is de-asserted (e.g., brought low) at a sixth time point 210. In response to the de-assertion, the saved value of the flip-flop prior to the power-save mode is restored to the data output Q following the sixth time point 210. Subsequent changes to the data input D, the clock signal, and the reset input during a second portion 211 of the interface functional waveforms 200 following the low-power mode portion 202 allows the flip-flop to again operate in a similar manner to that of the first portion 201.

Figure 3:
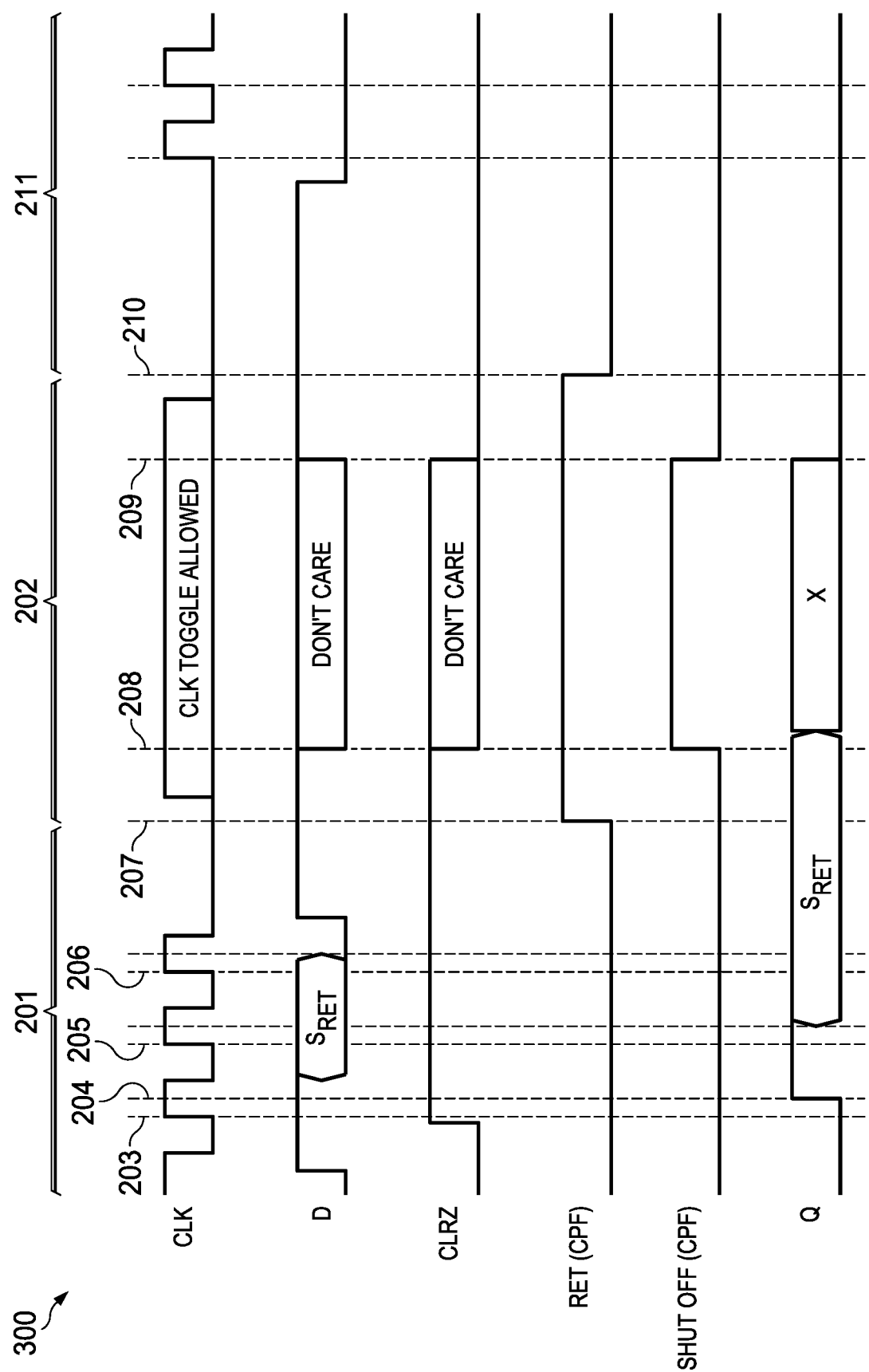
FIG. 3 is an example interface functional waveform of a low-power cell according to one or more disclosed implementations.

FIG. 3 illustrates interface functional waveforms 300 showing operation of the exemplary low-power D flip-flop cell of FIG. 2 before, during, and after the power-save operational mode in another example. In FIG. 3, the data input D, the clock input, and the data output Q and their operation are identical to the pulse signal diagram 200 of FIG. 2 through the fifth time point 209. That is, prior to the low-power mode portion 202, the flip-flop operates as a standard D flip-flop. At third time point 207, the state of the flip-flop is retained, and the shutoff condition of the flip-flop begins at the fourth time point 208.

As illustrated, the de-assertion (e.g., high signal) of the reset line carried throughout the shutoff condition of the low-power mode portion 202 or re-asserted during the shutoff condition such that an active low signal on the reset input exists at the fifth time point 209 or between 209 and 210 results in the clearing of any value on the data output Q. Accordingly, the saved value of the flip-flop during the shutoff event is disregarded in favor of resetting (e.g., clearing) the value on the data output Q. The resetting of the data output Q in response to the reset line being active low at the fifth time point 209 is not affected by an asserted retention signal (e.g., a high signal) on the retention control input unlike the restoration of the saved state as described with respect to the interface functional waveforms 200.

Figure 4:
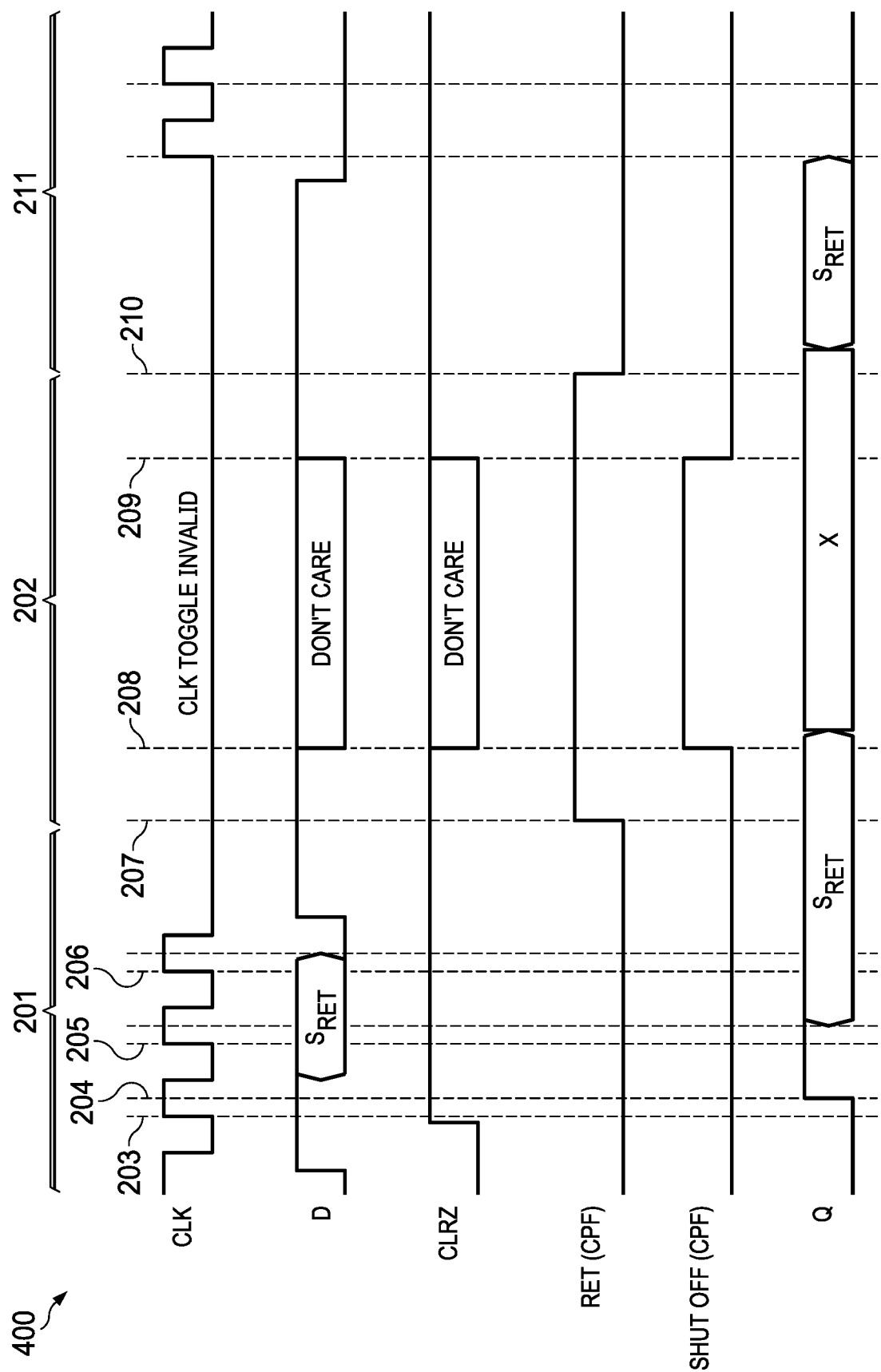
FIG. 4 is an example interface functional waveform of a low-power cell according to one or more disclosed implementations.
Figure 5:
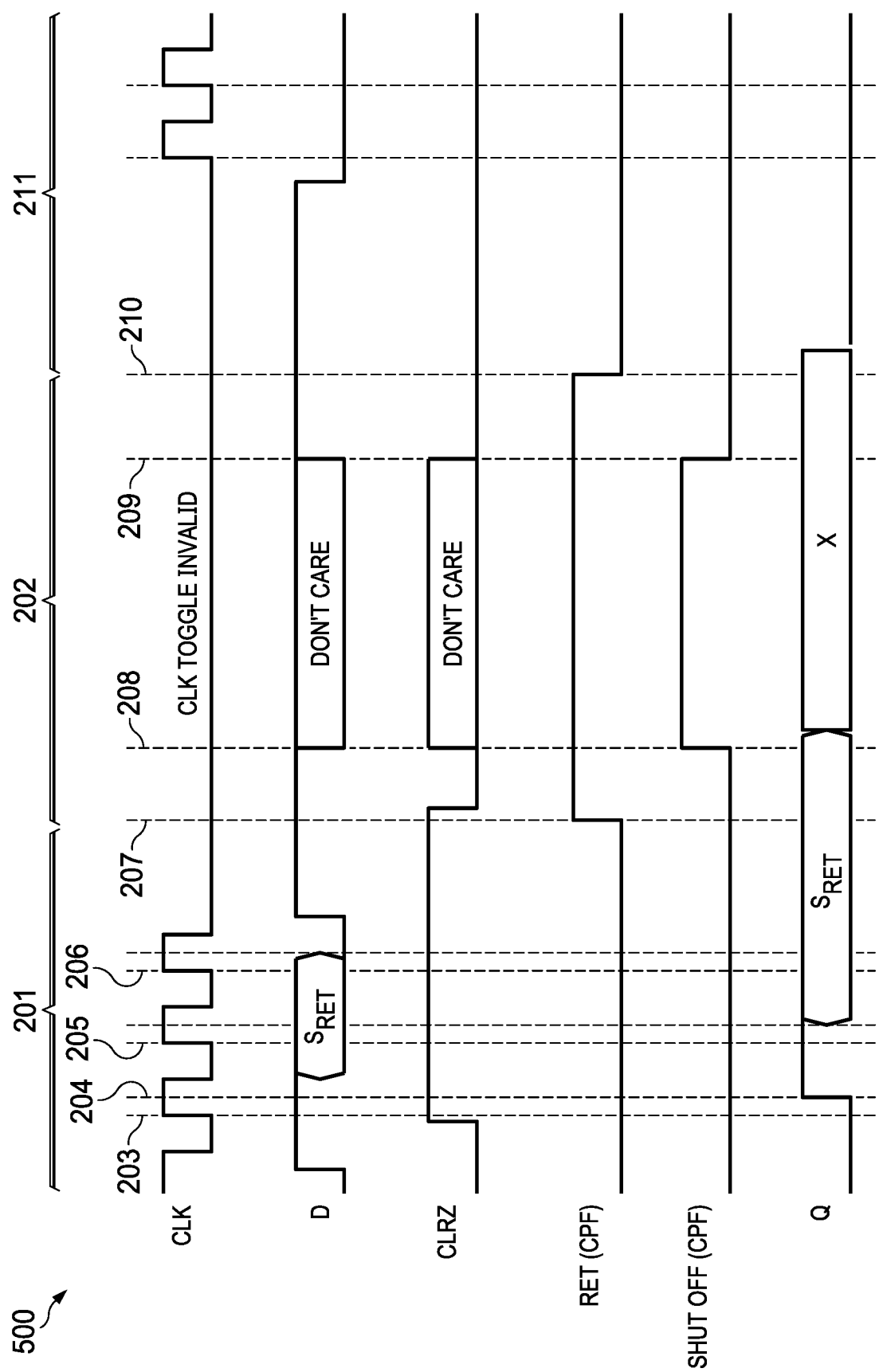
FIG. 5 is an example interface functional waveform of a low-power cell according to one or more disclosed implementations.

FIGS. 4 and 5 illustrate example pulse signal diagrams 400, 500 of a low-power cell having a different construction than the low-power cell represented by the interface functional waveforms 200, 300 of FIGS. 2 and 3. The portions and time points 201-211 identified in FIG. 2 are referenced in FIGS. 4 and 5 to simplify comparisons between the figures. The low-power cell represented by the pulse signal diagrams 400, 500 may occupy less SoC real estate in one example. In response to the different construction, the functionality of the low-power cell may also be different as described below.

As illustrated in FIGS. 2 and 4, the operations of the respective flip-flops represented by the interface functional waveforms 200, 400 are identical or substantially similar throughout the first portion 201 and throughout the second portion 211. One difference in the operation of the flip-flop represented by the interface functional waveforms 400 to that of the flip-flop represented by the interface functional waveforms 200 regards clock toggling within the low-power mode portion 202. While the flip-flop represented by the interface functional waveforms 200 allows clock toggling within the low-power mode portion 202, the flip-flop represented by the interface functional waveforms 400 does not allow clock toggling within the low-power mode portion 202. Due to the construction of the flip-flop, any toggling of the signal on the clock input during the assertion of the retention control input causes the stored Q value to become corrupted or be lost. As a result, any restoration of the stored Q value during the second portion 211 results in the restoration of an unknown value, and the data cannot be relied on to be accurate to the Q value stored at the beginning of the low-power mode portion 202.

As illustrated in FIGS. 3 and 5, the operations of the respective flip-flops represented by the interface functional waveforms 300, 500 are distinct within the low-power mode portion 202 and during a first portion of the second portion 211. Due to the construction of the flip-flop represented by the interface functional waveforms 500, the resetting of the data output Q in response to an asserted reset line occurs only after the retention control input is de-asserted at the sixth time point 210 rather than in response to the primary power supply getting switched on i.e., shutoff state getting de-asserted at the fifth time point 209 as illustrated in the interface functional waveforms 300 of FIG. 3. In addition, clock toggling during the low-power mode portion 202 is not allowed in the flip-flop represented by the pulse signal diagram 500 as described above with respect to FIG. 4.

Referring again to FIG. 1, as described above, the main power supply bus 101 may supply a voltage at a different level than the voltage of the auxiliary power supply bus 106. Accordingly, level-shifting is used to communicate useful data between the first power island 104 and the auxiliary power island 107. As illustrated, the first IP block 102 includes a first output 117 coupled to an input 118 of the second IP block 108, a second output 119 coupled to an input 120 of the third IP block 109, a first input 121 coupled to an output 122 of the second IP block 108, and a second input 123 coupled to the output component 113 of the third IP block 109. Level-shifting components 124-127 respectively coupled to the outputs 117, 119 and inputs 121, 123 provide a conversion between the different voltage levels on the main and auxiliary power supply busses 101, 106. It is important to note that the level-shifting cells do not have any special operational requirements on their own during the power-save mode, but they are used to avoid higher power consumption, poor reliability, and erroneous functionality due to incorrect electrical voltage levels representing the logic states. A signal powered by a supply of lower voltage level driving an input powered by a supply of higher voltage level can result in higher current consumption on the supply of higher voltage level and also an erroneous functional behavior. However, while a signal powered by a supply of higher voltage level driving an input powered by a supply of lower voltage level may not result in an erroneous functional behavior, it may still result in a higher current consumption on the power supply of higher voltage level and may also result in a poor reliability of the input circuit operating off the power supply of lower voltage level depending on the actual circuit implementation and underlying components.

Figure 6:
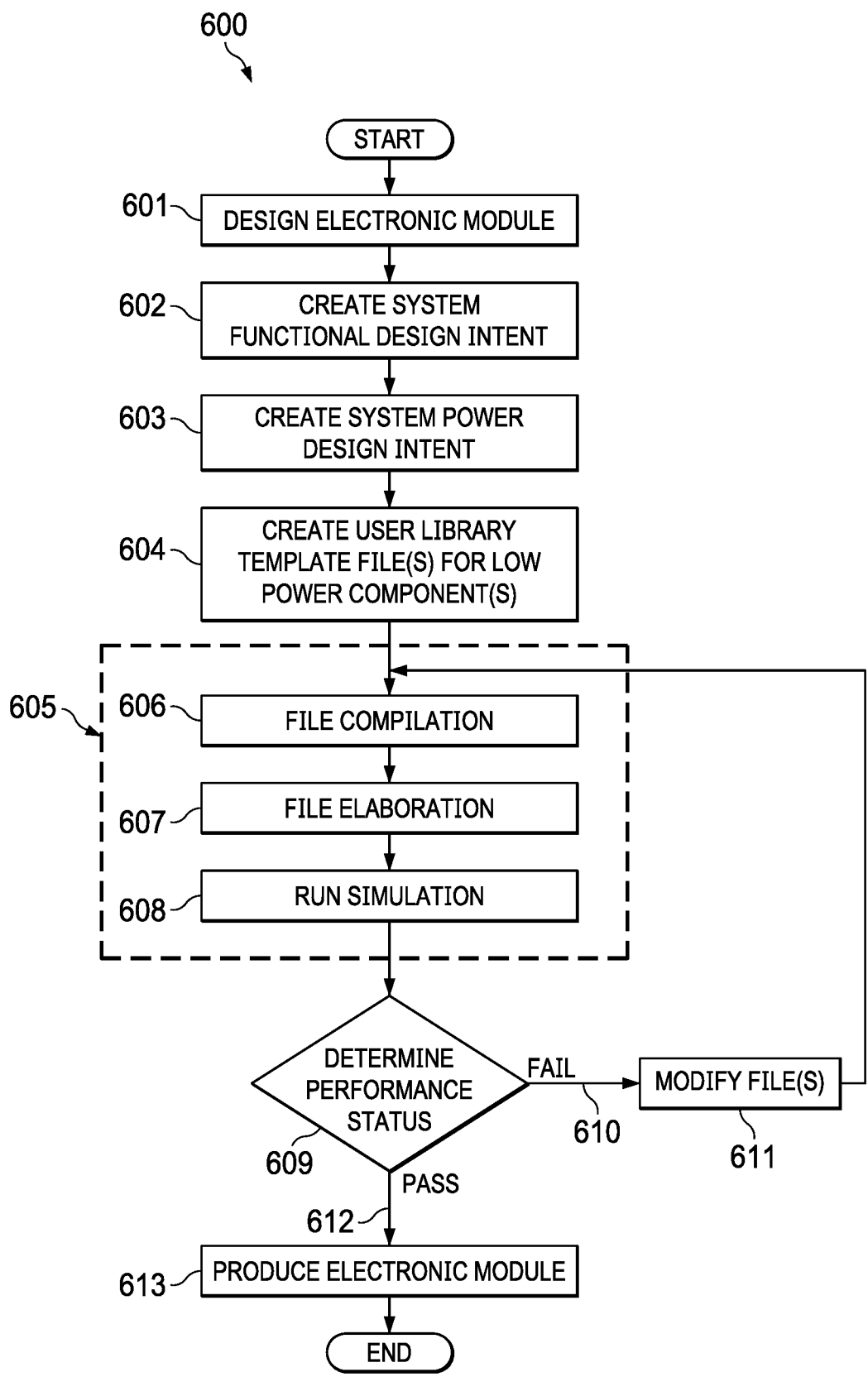
FIG. 6 is a flow diagram for designing and simulating chip functional behavior according to one or more disclosed implementations.

FIG. 6 illustrates a flow diagram of an operation 600 for designing, simulating, and manufacturing an SoC in accordance with one or more example implementations. Operation 600 begins with designing an electronic module or SoC at block 601. An example of designing the SoC is described below. Designing the SoC includes designing both the hardware and the software controlling the microcontroller, microprocessor or DSP cores, peripherals, interfaces, and other software components. Once the overall architecture of the SoC has been designed and defined, a system functional design intent is created in a file at block 602 that defines a model of the functional behavior including that of standard low-power components. In the system functional design intent file, individual hardware elements may be described in a design abstraction called RTL, which stands for register-transfer level. RTL is used to define the circuit behavior. Hardware elements are connected together in the same RTL language to create the full SoC design. In digital circuit design, RTL is a design abstraction which models a synchronous digital circuit in terms of the flow of digital signals (data) between hardware registers, and the logical operations performed on those signals. RTL abstraction is used in hardware description languages (HDLs) like Verilog and VHDL to create high-level representations of a circuit, from which lower-level representations and ultimately actual wiring can be derived. The RTL exists in a system functional design intent file.

A system power design intent is created in a file at block 603. In the system power design intent file, power requirements for the low-power cells or components in the SoC architecture design are defined using, for example, the common power format (CPF). Examples related to power intent herein are based on implementations including CPF for simplicity and are not meant to limit the disclosure thereto. Other formats such as the unified power format (UPF) may be alternatively used that yield similar results to the implementations described herein.

Figure 7:
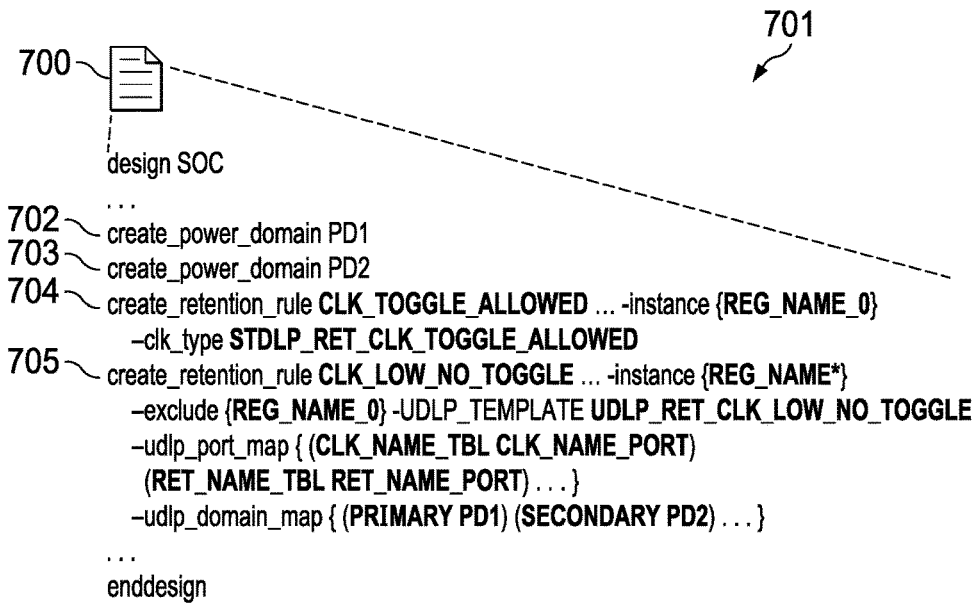
FIG. 7 is an example of a portion of a system power design intent file according to one or more disclosed implementations.

FIG. 7 illustrates a portion of an example system power design intent file 700 incorporating CPF-based definitions according to an implementation. As illustrated, the code 701 within the file 700 defines the creation of one or more power domains 702, 703 as well as the creation of one or more retention rules 704, 705. The pair of power domains 702, 703 and the pair of retention rules 704, 705 are among the plurality of power design intent definitions within the complete file 700. The power design intent can also include isolation rules, level shifter rules and power switch rules among other low power features, though they are not illustrated in this example to maintain simplicity.

Figure 8:
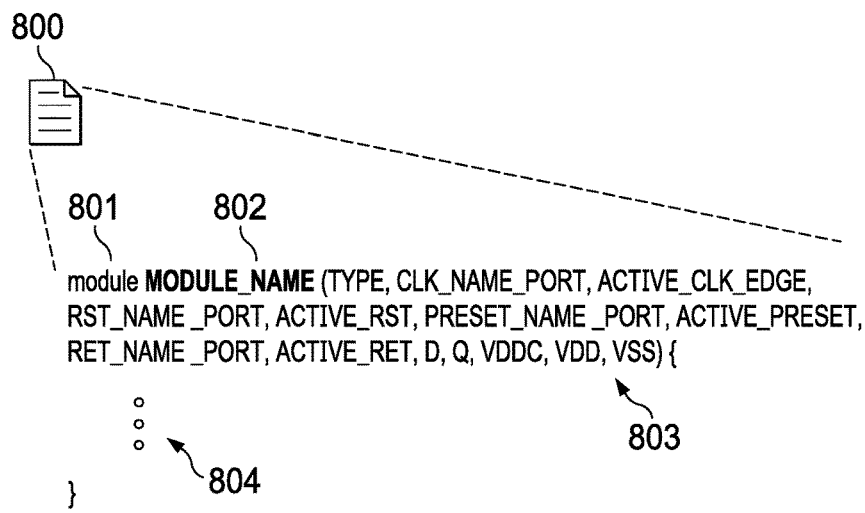
FIG. 8 is an example of a portion of a user-definable functional design intent template file according to one or more disclosed implementations.
Figure 10:
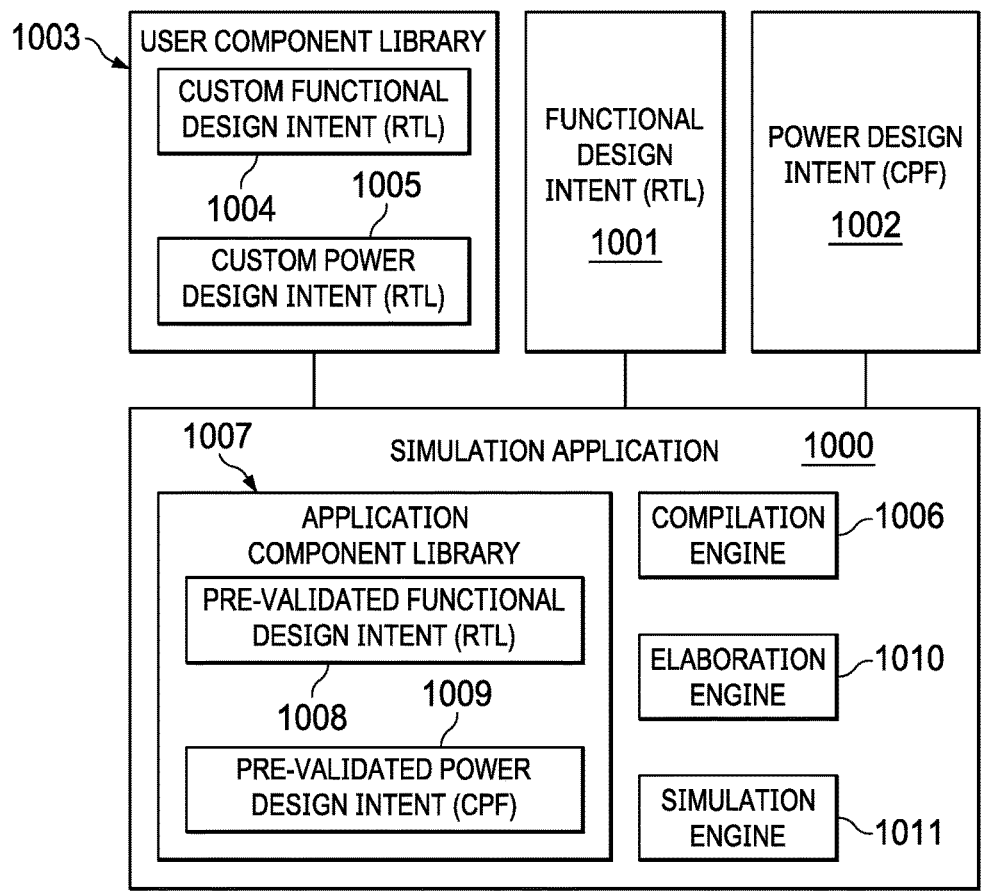
FIG. 10 is a block diagram of a simulation application according to one or more disclosed implementations.

Referring back to FIG. 6, user-created library files are created at block 604 based on a template format for low-power components designed in block 601 that are not part of a simulation application's standard library (FIG. 10). FIG. 8 illustrates a template 800 usable to create a user-defined functional design intent library file at block 604. The template 800 includes a keyword 801 "module" followed by a user-definable module name 802, following Verilog HDL syntax for an example. Additionally, one or more parameters 803 used in the definition of the functional operation of the low-power component defined by the template 800 are included after the module name. In the implementation illustrated in FIG. 8, a module for a low-power flip-flop such as the D flip-flop represented by the interface functional waveforms of FIGS. 4 and 5 as an example. Templates 800 for other types of low-power components include different parameters 803, but the basic format of the keyword, module name, and parameter list is maintained. A functional design intent code definition section 804 provides a space for the component library or SoC designer to define the operation of the low-power component. The template 800 allows the designer to create the functional design intent library file in the same language (e.g., RTL) as the system functional design intent created at block 602.

Figure 9:
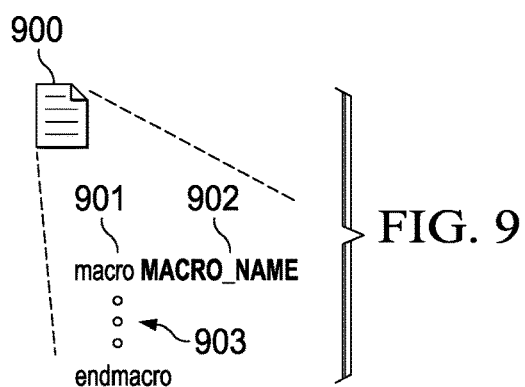
FIG. 9 is an example of a portion of a user-definable power design intent template file according to one or more disclosed implementations.

FIG. 9 illustrates a template 900 usable to create a user-defined power design intent library file at block 604. The template 900 includes a keyword 901 "macro" followed by a user-definable macro name 902, following CPF language syntax for an example. A power design intent code definition section 903 provides a space for the component library or SoC designer to define one or more power definitions for the low-power component. The template 900 allows the designer to create the power design intent library file in the same language (e.g., CPF) as the system power design intent created at block 603.

Returning to FIG. 6, a simulation 605 is performed based on the files created in blocks 602-604. Referring to FIGS. 6 and 10, a simulation application or program 1000 accesses a system functional design intent file 1001, a system power design intent file 1002, and a user component library 1003 external to the simulation application 1000 in a file compilation block 606 of the simulation 605 of the operation 600. The user component library 1003 includes one or more custom (e.g., user defined) functional design intent files 1004 and one or more custom (e.g., user defined) power design intent files 1005 created at block 604 based on the templates 800, 900. The user component library 1003 defines the functional and power design intent data for the user-defined parts that are not defined in the functional design intent file 1001 or the system power design intent file 1002. In one part, the file compilation block 606, executed by a compilation engine 1006 accesses the external files 1001-1003 to identify any syntax errors that would prevent a successful simulation implementation. The functional design intent file 1001 and/or the system power design intent file 1002 may reference directly or through inference upon compilation one or more low-power components pre-validated and existing in an application component library 1007 provided within the simulation application 1000. Low-power components existing within the application component library 1007 are defined in a corresponding pre-validated functional design intent library file 1008 and in a corresponding pre-validated power design intent library file 1009. The application component library 1007 is generated by an EDA tool vendor providing the simulation application 1000 and contains low-power components for which the functional and power design intents were provided to the EDA tool vendor to validate and incorporate into the simulation application 1000. The low-power components within the application component library 1007 are fixed and are not modifiable by the SoC designer. Accordingly, for custom low-power components not included in the application component library 1007, the SoC designer creates the custom functional and power design intent files 1004, 1005 as described above.

At block 607 of the simulation 605, file elaboration is performed by the simulation application 1000 using an elaboration engine 1010 to create a simulation linking the components of the SoC as defined in the simulation configuration files (e.g., the functional design intent file 1001, the system power design intent file 1002, the user component library 1003, the application component library 1007, etc.). The simulation object created at block 607 is run or executed by a simulation engine 1011 of the simulation application 1000 at block 608 of the simulation 605 to simulate operation of the SoC design.

At block 609 of the operation 600, a performance status of the SoC may be determined based on the executed simulation. The SoC designer or other personnel may compare output of the simulation based on how the behavior and functionality were designed to work and determine whether the simulation represented operation of the SoC as expected. If the performance status indicates a failure 610, one or more of the simulation configuration files may be modified in response. For example, a user-defined low-power component in the custom functional design intent file 1004 may be modified at block 611 in response to re-designing the low-power component in the SoC design. The modification may also be manifested in the functional design intent file 1001 and/or the system power design intent file 1002. If the performance status indicates a pass or other satisfactory result 612, the SoC design may be manufactured to produce the designed SoC in physical form at block 613.

During design compilation and/or elaboration (e.g., blocks 606, 607), a table of component objects may be determined based on the functional design intent file 1001 and/or the system power design intent file 1002. FIG. 11 illustrates a sample portion of a generated table 1100 showing a plurality of identified registers defined in the SoC and related files. As shown, each register definition is based on a template format:

REG_NAME _TBL | [L|F] | CLK_NAME_TBL | [P|N] | RST_NAME_ TBL | [H|L] | PRESET_NAME_ TBL | [H|L] | RET_NAME _ TBL | [H|L]

As illustrated in FIG. 7 according to an example, the system power design intent file 700 includes retention rule 704 that creates a retention rule named CLK_TOGGLE_ALLOWED that includes a flip-flop REG_NAME_0 from the table 1100. The clock type for the retention rule 704 is named STDLP_RET_CLK_TOGGLE_ALLOWED. During the elaboration process (e.g., block 607 of FIG. 6), the clock type name of the retentions rules defined in the system power design intent file 700 are used to identify whether low-power component definitions related to the clock type name are found in the application component library 1007 within the simulation application 1000. In this example, the clock type name STDLP_RET_CLK_TOGGLE_ALLOWED is linked to and found within the pre-validated functional and power design intent files 1008, 1009 and correlates to the functionality of the flip-flop(s) defined by the interface functional waveforms 200, 300 that allow clock toggling in the low-power mode portions 202 as illustrated in FIGS. 2 and 3. Since the clock type name is found within the simulation application library, the functional and power design intents of the flip-flop REG_NAME_0 are based on the default library files as intended by the SoC design and cannot be modified.

An example of the functional design intent of the default library flip-flop of the current example is represented by a pseudo code listing 1200 shown in FIG. 12. The pseudo code represents a higher-language implementation of the RTL present in the pre-validated functional design intent file 1008. As indicated in the code 1200, none of the actions listed define an action to be taken in response to a toggling of the clock input. Since clock toggling is allowed in the construction of the flip-flop REG_NAME_0, any clock toggling during the low-power mode portion 202 is ignored in the pseudo code listing 1200.

In contrast, FIG. 13 illustrates an example pseudo code listing 1300 for the flip-flop(s) defined by the interface functional waveforms 400, 500 that do not allow clock toggling in the low-power mode portions 202 as illustrated in FIGS. 4 and 5. The pseudo code listing 1300 includes functionality that checks for a valid state of the associated clock signal on the clock input of the flip-flop during the simulation time steps. An invalid state of the clock signal may be a high signal on the clock line during the low-power mode portion 202 in one example. The existence of the invalid clock state, when experienced by a physical flip-flop having a design based on the functionality of the pulse signal diagrams 400, 500 exhibits a corrupted state of the output line Q because of a clock toggle. Accordingly, the pseudo code listing 1300 mimics the physical behavior during the simulation.

Incorporating the pseudo code listing 1300 in the simulation based on the system power design intent file 700 for one or more parts includes identifying, in the retention rule 705, those elements of the table 1100 that should be referenced to the functionality of the pseudo code listing 1300. In the example herein, the RTL represented by the pseudo code listing 1300 may be inserted into the custom functional design intent file 1004 based on the template 800 having a module name 802 matching the clock type name UDLP_RET_CLK_LOW_NO_TOGGLE defined in the retention rule 705. During the elaboration process (e.g., block 607 of FIG. 6), in response to not finding the user defined low-power (UDLP) clock type name UDLP_RET_CLK_LOW_NO_TOGGLE in the application component library 1007 within the simulation application 1000, the user component library 1003 is accessed to determine whether the UDLP clock name is defined therein. Since the UDLP clock name is linked with the corresponding UDLP clock names in the user component library 1003 in this example, the user component library 1003 is used to link the named flip-flops in the table 1100 (e.g., all flip-flops starting with "REG_NAME" excluding REG_NAME_0) to the related user library components during the elaboration block 607 of FIG. 6. In addition to defining the functional design intent for the module UDLP_RET_CLK_LOW_NO_TOGGLE in the custom functional design intent file 1004, as illustrated in FIG. 14, the user component library 1003 defines the power design intent for the UDLP_RET_CLK_LOW_NO_TOGGLE as shown in a related user library power design intent file 1400. In the code 1401 of the file 1400, PRIMARY and SECONDARY power domains are defined for the UDLP_RET_CLK_LOW_NO_TOGGLE clock type.

During execution of a simulation (e.g., simulation 605 of FIG. 6) incorporating the UDLP_RET_CLK_LOW_NO_TOGGLE clock type, violations of the toggling of the clock signal input into the flip-flops REG_NAME_1 to REG_NAME_4 are identified, while the toggling of the clock signal input into the flip-flop REG_NAME_0 can be ignored.

Figure 15:
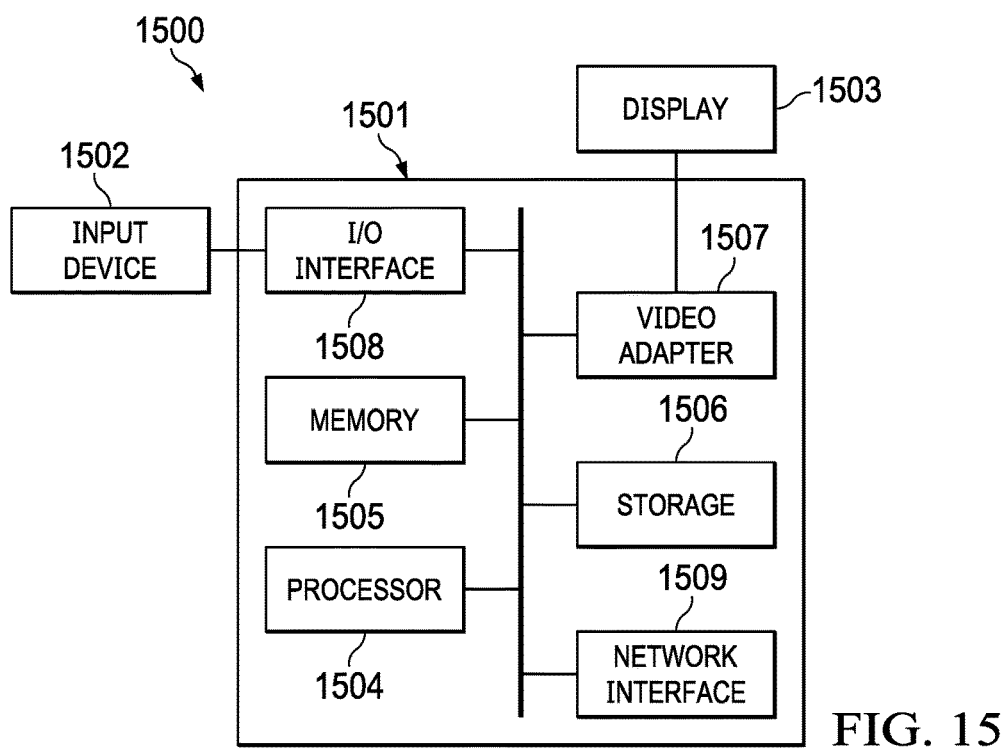
FIG. 15 is a block diagram of an example computer system that may be used to perform SoC simulation according to one or more disclosed implementations.

FIG. 15 is a block diagram of an example computer system 1500 that may be used to perform chip design simulation as described herein. The computer system 1500 includes a processing unit 1501 coupled to one or more input devices 1502 (e.g., a mouse, a keyboard, or the like), and one or more output devices, such as a display screen 1503. The display screen 1503 may be used to display progress of the simulation described herein to allow a user to monitor the operational performance of the simulation. In some embodiments, the display screen 1503 may be touch screen, thus allowing the display screen 1503 to also function as an input device. The processing unit 1501 may be, for example, a desktop computer, a workstation, a laptop computer, a tablet, a dedicated unit customized for a particular application, a server, or the like. The display screen 1503 may be any suitable visual display unit such as, for example, a computer monitor, an LED, LCD, or plasma display, a television, a high-definition television, or a combination thereof. The display screen 1503 can be used, for example, to perform and display the simulation and display the performance status of the simulation such as that described herein.

The processing unit 1501 includes a processor 1504, memory 1505, a storage device 1506, a video adapter 1507, and an I/O interface 1508 connected by a bus. The bus may be one or more of any type of several bus architectures including a memory bus or memory controller, a peripheral bus, video bus, or the like. The processor 1504 may be any type of electronic data processor. For example, the processor 1504 may be a processor from Intel Corp., a processor from Advanced Micro Devices, Inc., a Reduced Instruction Set Computer (RISC), an Application-Specific Integrated Circuit (ASIC), or the like. The memory 1505, e.g., a non-transitory computer-readable medium, can be any type of system memory such as static random-access memory (SRAM), dynamic random-access memory (DRAM), synchronous DRAM (SDRAM), read-only memory (ROM), a combination thereof, or the like. Further, the memory 1505 can include ROM for use at boot-up, and DRAM for data storage for use while executing programs.

The storage device 1506, e.g., a non-transitory computer-readable medium, can include any type of storage device configured to store data, programs, and other information and to make the data, programs, and other information accessible via the bus. In one or more embodiments, the storage device 1506 stores software instructions to be executed by the processor 1504 to perform embodiments of the methods described herein. The storage device 1506 may be, for example, one or more of a hard disk drive, a magnetic disk drive, an optical disk drive, a solid-state drive, or the like.

The video adapter 1507 and the I/O interface 1508 provide interfaces to couple external input and output devices to the processing unit 1501. The processing unit 1501 also includes a network interface 1509. The network interface 1509 allows the processing unit 1501 to communicate with remote units via a network (not shown). The network interface 1509 may provide an interface for a wired link, such as an Ethernet cable or the like, or a wireless link. The computer system 1500 may also include other components not specifically shown. For example, the computer system 1500 may include power supplies, cables, a motherboard, removable storage media, cases, and the like.

While an SoC is primarily used throughout the above disclosure as an example type of chip, it will be appreciated that the techniques described herein may be applied in designing any type of IC chip. For instance, such IC chips may include a general-purpose or application-specific (ASIC) processor based upon x86, RISC, or other architectures, field-programmable gate array (FPGA), graphics processor (GPU), digital signal processor (DSP), a system-on-chip (SoC) processor, microcontroller, and/or related chip sets. By way of example only, the IC chip may be a model of a digital signal processor, an embedded processor, an SoC, or a microcontroller available from Texas Instruments Inc. of Dallas, Tex.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method comprising:
    creating an electronic module design having a plurality of electronic components;
    defining a model of functional behavior of a subset of the plurality of electronic components based on the electronic module design, the subset of the plurality of electronic components excluding a first electronic component of the plurality of electronic components;
    defining a functional behavior of the first electronic component in a user-defined functional design intent file based on a first template;
    defining a power behavior of the first electronic component in a user-defined power design intent file based on a second template;
    generating a simulation file based on the model of functional behavior and based on the functional behavior and the power behavior of the first electronic component;
    running the simulation file to simulate operation of the electronic module design;
    determining a performance status of the electronic module design in response to running the simulation file.

2. The method of claim 1, wherein the first electronic component comprises a low-power component; and
    wherein running the simulation file comprises:
        simulating shutting down power being supplied to a first portion of the first electronic component during a period of time; and
        simulating maintaining power being supplied to a second portion of the performance status during the period of time.

3. The method of claim 2, wherein the first electronic component comprises one of a state retention component, a level shifting component, a power switch component, and an isolation component.

4. The method of claim 2, wherein the plurality of electronic components comprises a power switch coupled to a first power bus of the electronic module;
    wherein the power switch is configured to:
        transfer power from the first power bus to a second power bus in response to a closed state condition of the power switch; and
        prohibit a transfer of power from the first power bus to the second power bus in response to an open state condition of the power switch;
    wherein the first portion of the first electronic component is coupled to the second power bus; and
    wherein the second portion is coupled to the first power bus.

5. The method of claim 1, wherein generating the simulation file comprises generating the simulation file via a simulation program, wherein the simulation program comprises an internal library comprising:
    a power behavior definition of a pre-validated low-power component; and
    a functional behavior of the pre-validated low-power component;

wherein the first and second external library templates are external to the simulation program.

6. The method of claim 5, wherein the subset of the plurality of electronic components comprises a second electronic component;
wherein the first electronic component comprises a first low-power component;
wherein the second electronic component comprises a second low-power component; and
wherein generating the simulation file further comprises:
accessing the user-defined functional design intent file to incorporate the functional behavior of the first electronic component in the simulation file;
accessing the user-defined power design intent file to incorporate the power behavior of the first electronic component in the simulation file; and
incorporating a functional and power behavior of the second electronic component in the simulation file based on the functional and power behavior definition of the pre-validated low-power component within the internal library.

7. The method of claim 6 further comprising creating a system power intent, the system power intent comprising:
a first reference to the first electronic component, the first reference correlating the first electronic component to the user-defined functional design intent file and to the user-defined power design intent file; and
a second reference to the second electronic component, the second reference correlating the second electronic component to the functional and power behavior definition of the pre-validated low-power component within the internal library.

8. The method of claim 6, wherein the first reference comprises a user-defined keyword;
wherein the user-defined functional design intent file comprises the user-defined keyword; and
wherein the user-defined power design intent file comprises the user-defined keyword.

9. The method of claim 8, wherein the user-defined keyword relates to a user-defined clock behaviour.

10. The method of claim 6 further comprising:
modifying the functional behavior of the first electronic component in the user-defined functional design intent file;
modifying the simulation file based on the modified functional behavior of the first electronic component; and
running the modified simulation file.

11. The method of claim 10, wherein the modifying of the functional behavior and the running of the modified simulation file are performed in response to determining the performance status as a failed performance status.

12. The method of claim 1 further comprising producing an electronic module based on the electronic module design in response to determining the performance status as a satisfactory performance status.

13. A system comprising:
a non-transitory computer-readable medium storing software instructions, wherein the software instructions comprise software instructions to:
access, via a simulation program, a system model of functional behavior of a circuit design comprising a first electronic component;
access, via the simulation program, a user-defined functional design intent file defining a functional behavior of a second electronic component, wherein the user-defined functional design intent file is external to the simulation program;
access, via the simulation program, a user-defined power design intent file defining a power behavior of the second electronic component, wherein the user-defined power design intent file is external to the simulation program;
create, via the simulation program, a simulation file based on the system model and based on the functional behavior and the power behavior of the second electronic component, the simulation file comprising simulation operation details for the first and second electronic components; and
run, via the simulation program, a first simulation of the circuit design using the simulation file in a simulation program, the simulation file configured to cause the simulation program to:
simulate an operation of the first electronic component based on the simulation operation details for the first electronic component; and
simulate operation of the second electronic component based on the simulation operation details for the second electronic component.

14. The system of claim 13, wherein the second electronic component comprises a first low-power component; and
wherein the functional behavior of the second electronic component in the user-defined functional design intent file comprises:
functional data related to turning off a first portion of the second electronic component for a first period of the first simulation; and
functional data related to maintaining power supplied to a second portion of the second electronic component during the first period of the first simulation.

15. The system of claim 14, wherein the second electronic component comprises one of a state retention component, a level shifting component, a power switch component, and an isolation component.

16. The system of claim 14, wherein the first electronic component comprises a second low-power component; and
wherein creating the simulation file comprises accessing power behavior data for the first electronic component defined in a component library internal to the simulation program.

17. The system of claim 16, wherein the software instructions further comprise software instructions to access a system power intent file to:
identify a first link linking the first electronic component to the component library internal to the simulation program; and
identify a second link linking the second electronic component to the user-defined functional design intent file external to the simulation program.

18. The system of claim 16, wherein the second link comprises a user-defined keyword;
wherein the user-defined functional design intent file comprises the user-defined keyword; and
wherein the user-defined power design intent file comprises the user-defined keyword.

19. A method of manufacturing a System on a Chip (SoC) comprising:
creating an electronic design of the SoC, the SoC comprising the first and second electronic components of the system of claim 13;
executing the software instructions of claim 13;
determining a performance status of the first simulation;
manufacturing the SoC based on the performance status.

20. The method of claim 19 further comprising:
updating the user-defined functional design intent file to modify the functional behavior of the second electronic component in response to determining the performance status as a failed performance status; and
wherein the software instructions further comprise software instructions to:
create, via the simulation program, a modified simulation file based on the modified functional behavior of the second electronic component; and
run a second simulation of the circuit design using the modified simulation file in the simulation program.

* * * * *